United States Patent [19]

Tanaka et al.

[11] Patent Number: 5,003,536
[45] Date of Patent: Mar. 26, 1991

[54] COMMUNICATION SYSTEM

[75] Inventors: Shotaro Tanaka; Masao Ikezaki, both of Osaka; Yukiko Hase Nee Ono, Tokyo, all of Japan

[73] Assignee: Matsushita Electric Industrial Co., Ltd., Japan

[21] Appl. No.: 377,397

[22] Filed: Jul. 10, 1989

[30] Foreign Application Priority Data

Jul. 11, 1988 [JP] Japan ................................. 63-172107

[51] Int. Cl.⁵ ................................................. H04J 3/26
[52] U.S. Cl. .................................. 370/94.1; 340/825.5
[58] Field of Search .................... 370/79, 85.1, 85.2, 370/85.6, 92, 94.1, 110.1; 340/825.07, 825.5, 825.51, 825.52

[56] References Cited

U.S. PATENT DOCUMENTS 4,787,083 11/1988 Tanaka ...................................... 370/92
4,890,280 12/1989 Hirata ................................... 370/94.1
4,916,692 4/1990 Clarke et al. ............................ 370/92

Primary Examiner—Douglas W. Olms
Assistant Examiner—Melvin Marcelo
Attorney, Agent, or Firm—Lowe, Price, Leblanc, Becker & Shur

[57] ABSTRACT

In cases where a first communication control unit locks a second communication control unit to communicate with the second unit, the first unit stores a data representing a time remaining until the locking of the second unit is released. In these cases, the second unit stores a data representing an address of the first unit as a lock address corresponding to an address of a unit which locks the second unit. In cases where a third communication control unit tries to communicate with the second unit and fails the communication with the second unit, the third unit connects with the second unit and reads out the data representative of the lock address from the second unit, and then the third unit connects with the first unit in response to the lock address and reads out the data representative of the lock remaining time from the first unit. The third unit retries to communicate with the second unit after the lock remaining time elapses.

4 Claims, 8 Drawing Sheets

FIG. 3

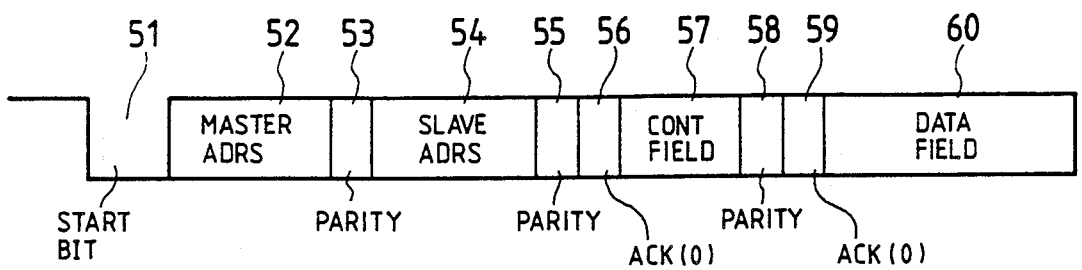

FIG. 4

| CONT FIELD BIT VALUE | | | | DATA TRANS DIRECTION | CONTENTS | LOCK OPERATION |
|---|---|---|---|---|---|---|
| B3 | B2 | B1 | B0 | | | |
| 0 | 0 | 0 | 0 | SLAVE → MASTER | READ OUT SLAVE STATUS | NONLOCK |
| 0 | 0 | 0 | 1 | | INDEFINITE | INDEFINITE |
| 0 | 0 | 1 | 0 | | READ OUT SLAVE STATUS | LOCK |
| 0 | 0 | 1 | 1 | | READ OUT DATA | LOCK |
| 0 | 1 | 0 | 0 | | READ OUT LOCK ADRS (M, L) | NONLOCK |
| 0 | 1 | 0 | 1 | | READ OUT LOCK ADRS (H) | NONLOCK |
| 0 | 1 | 1 | 0 | | READ OUT SLAVE STATUS | UNLOCK |
| 0 | 1 | 1 | 1 | | READ OUT DATA | UNLOCK |
| 1 | 0 | 0 | 0 | MASTER → SLAVE | WRITE MEMORY ADRS | LOCK |
| 1 | 0 | 0 | 1 | | INDEFINITE | INDEFINITE |
| 1 | 0 | 1 | 0 | | WRITE COMMAND | LOCK |
| 1 | 0 | 1 | 1 | | WRITE DATA | LOCK |
| 1 | 1 | 0 | 0 | | INDEFINITE | INDEFINITE |
| 1 | 1 | 0 | 1 | | INDEFINITE | INDEFINITE |
| 1 | 1 | 1 | 0 | | WRITE COMMAND | UNLOCK |
| 1 | 1 | 1 | 1 | | WRITE DATA | UNLOCK | ns
COMMUNICATION SYSTEM

BACKGROUND OF THE INVENTION

This invention relates to a communication system.

In some known communication networks including a plurality of units or stations connected via a common transmission line, when a first station requires a communication with a second station, the first station transmits a locking (holding) packet to the second station to lock (hold) the second station into a state where the second station accepts a subsequent packet or packets from the first station but rejects any packets from other stations. Upon the receipt of the locking packet, the second station recognizes that the second station is locked by the first station. At an end of the communication, the first station transmits an unlocking (unholding) packet to the second station to release the second station from the locked state. When the second station moves out of the locked state, the second station can accept packets from any stations. During the interval where the second station remains locked by the first station, when a third station transmits a packet to the second station, the transmitted packet is rejected by the second station. The third station is informed by the rejection of the transmitted packet that the second station is held by another station. In some cases, the third station abandons the communication with the second station. In other cases, the third station retransmits the packet to the second station at a moment a predetermined time after the first transmission of the packet.

In these prior art communication networks, while a first station remains locking a second station, a third station can not communicate with the second station. In addition, since the third station is not previously informed of the expected time of the end of the communication between the first and second stations, the third station tends to wastefully transmit a packet many times.

SUMMARY OF THE INVENTION

It is an object of this invention to provide an efficient communication system.

A first communication system of this invention comprises first, second, and third communication control units identified by respective different addresses; the first unit comprising means for, in cases where the first unit locks the second unit to communicate with the second unit, storing a data representing a time remaining until the locking of the second unit is released; the second unit comprising means for, in cases where the first unit locks the second unit to communicate with the second unit, storing a data representing the address of the first unit as a lock address corresponding to an address of a unit which locks the second unit; the third unit comprising means for, in cases where the third unit tries to communicate with the second unit and fails the communication with the second unit, connecting with the second unit and reading out the data representative of the lock address from the second unit, means for connecting with the first unit in response to the lock address and reading out the data representative of the lock remaining time from the first unit, and means for retrying to communicate with the second unit after the lock remaining time elapses.

A second communication system of this invention comprises first, second, and third communication control units identified by respective different addresses; the second unit comprising means for, in cases where the first unit locks the second unit, storing a data representing the address of the first unit as a lock address corresponding to an address of a unit which locks the second unit; the third unit comprising means for, in cases where the third unit tries to communicate with the second unit and fails the communication with the second unit, connecting with the second unit and reading out the data representative of the lock address from the second unit, means for connecting with the first unit in response to the lock address and requiring the first unit to inform the third unit that the first unit unlocks the second unit; the first unit comprising means responsive to the requiring by the third unit for, when the first unit unlocks the second unit. informing the third unit that the second unit is unlocked; the third unit further comprising means for retrying to communicate with the second unit when the third unit is informed that the second unit is unlocked.

BRIEF DESCRIPTION OF THE DRAWINGS

FiG. 3 is a diagram of a communication packet used in the communication system of FIG. 1.

FIG. 4 is a diagram showing the relation between the bit state and the contents of the control field of the communication packet of FIG. 3.

DESCRIPTION OF THE FIRST PREFERRED EMBODIMENT

Figure 1:
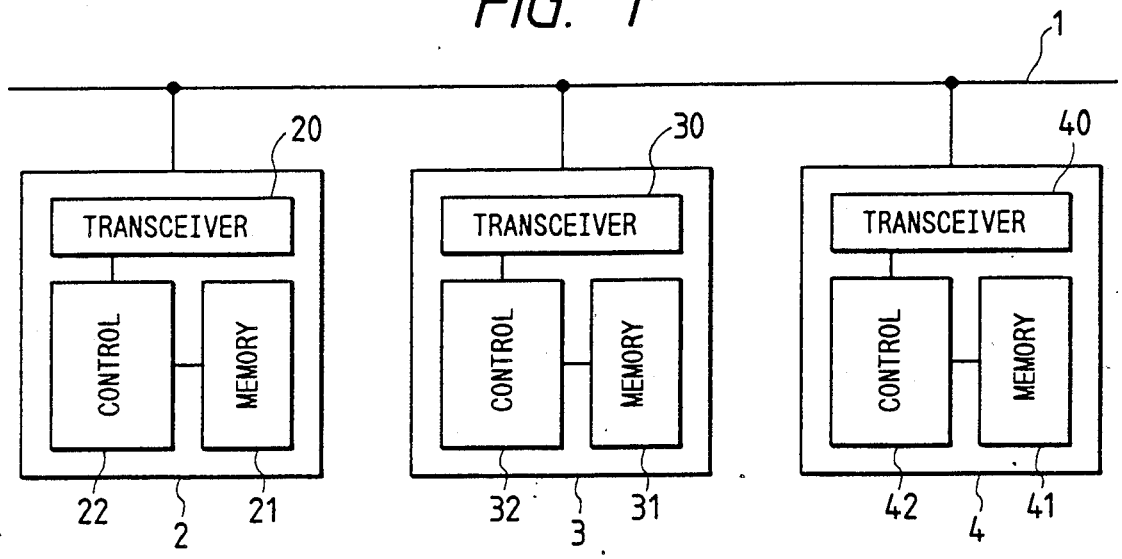
FIG. 1 is a block diagram of a communication system according to a first embodiment of this invention.
Figure 2:
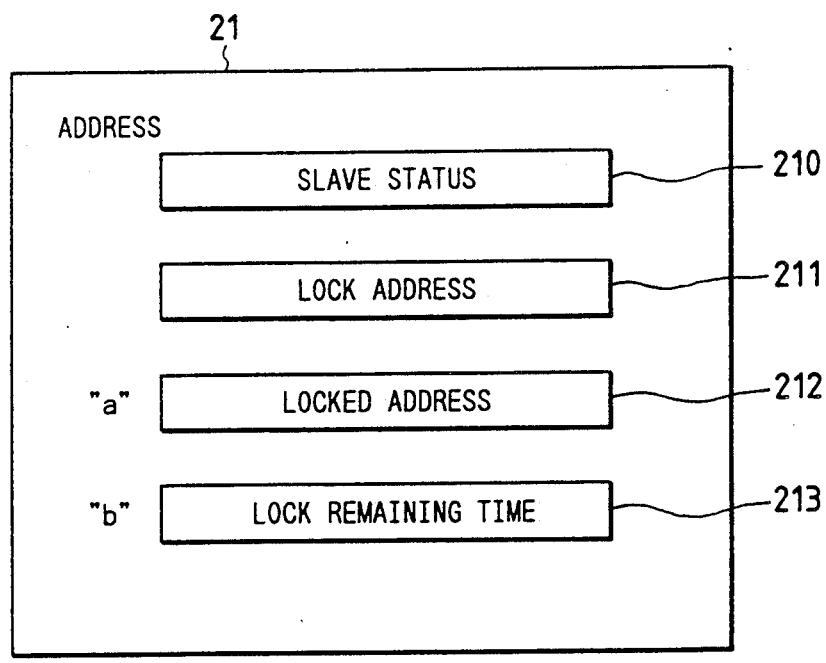
FIG. 2 is a diagram of a memory of FIG. 1.

With reference to FIG. 1, a communication network includes an information transmission line 1 and a plurality of stations or communication control units 2, 3, and 4 connected via the transmission line 1. The units 2-4 are similar in structure and function. The units 2-4 are denoted by different addresses so that they can be identified. The communication control unit 2 includes a packet transceiver 20, a memory 21, and a controller 22. The packet transceiver 20 is directly coupled to the transmission line 1. The packet transceiver 20 transmits and receives packets to and from the transmission line 1. The memory 21 stores slave status information data related to lock conditions and time information data related to a locking process. The controller 22 is connected between the packet transceiver 20 and the memory 21. The controller 22 controls the packet transceiver 20 and the memory 21. The controller 22 includes a microcomputer operating in accordance with a program stored in an internal ROM. Similarly, the communication control unit 3 includes a packet transceiver 30, a memory 31, and a controller 32. The communication control unit 4 also includes a packet transceiver 40, a memory 41, and a controller 42.

The memory 21 has segments for storing respective information data 210, 211, 212, and 213. Different addresses are allotted to the respective segments of the memory 21. For example, an address "a" is allotted to the memory segment for the information data 212 while an address "b" is allotted to the memory segment for the information data 213. The information data 210 relates to a slave status representing whether o not the unit 2 is in a locked (held) state. The information data 211 relates to a locking-unit address (a lock address), that is, an address of a unit which locks (holds) the unit 2. The information data 212 relates to a locked-unit address (a locked address), that is, an address of a unit which is locked by the unit 2. The information data 213 relates to a lock remainder or remaining time, that is, a time remaining until the unit 2 releases another unit from its locked state. The lock remaining time corresponds to the remainder of the time during which the unit 2 continues to lock another unit. The memories 31 and 41 are similar to the memory 21.

FIG. 3 shows a format of a communication packet. The packet includes a sequence of a start bit 51, a master address 52, a parity bit 53, a slave address 54, a parity bit 55, an ack (acknowledgment) bit 56, a control field 57, a parity bit 58, an ack bit 59, and a data field 60. The start bit 51 represents a start of the packet. The master address 52 corresponds to an address of a unit from which the packet is transmitted. The parity bit 53 is associated with the master address 54. The slave address 54 corresponds to an address of a unit to which the packet is directed. The parity bit 55 and the ack bit 56 are associated with the slave address 54. The control field 57 represents the type of an instruction or control. The parity bit 58 and the ack bit 59 are associated with the control field 57. The data field 60 represents the substance of a transmission message. The data field 60 includes one or more sets of 1-byte data, a parity bit and an ack bit associated with the data.

Each of the parity bits in the packet is used in the parity check on the associated address, field, or data. In addition, each of the ack bits is used to inform a packet-transmitting unit of whether or not the associated address, field, or data is successfully received by a packet-receiving unit. Specifically when the address field, or data is successfully received, the packet-receiving unit returns the ack bit of positive acknowledgment data "0" to the packet-transmitting unit. Otherwise, the packet-receiving unit returns the ack bit of negative acknowledgment data "1" to the packet-transmitting unit. The packet-transmitting unit controls the transmission of the packet in accordance with the acknowledgment data fed from the packet-receiving unit. For example, after the packet-transmitting unit transmits the slave address 54 and the parity bit 55, the packet-transmitting unit waits the ack bit 56 returned from the packet-receiving unit. After the packet-transmitting unit receives the ack bit 56, the packet-transmitting unit discriminates the content of the ack bit 56. When the ack bit 56 is positive, the packet-transmitting unit transmits the subsequent control field 57 to the packet-receiving unit. When the ack bit 56 is negative, the packet-transmitting unit performs a suitable action such as a retransmission of the sequence of the slave address 54 and the parity bit 55.

As shown in FIG. 4, the control field 57 has a sequence of four bits B3, B2, B1, and B1, representing the direction of data transmission, the contents of the control, and the contents of the lock operation. The direction of data transmission is of two types, one corresponding to the case where a transmitting side (a master) reads out data from a receiving side (a slave), the other corresponding to the case where a transmitting side (a master) writes data into a receiving side (a slave). The contents of the control are classified into the reading of a slave status, data, or a lock address, and the writing of a memory address, a command, or data. For example, when a slave receives a data-writing communication packet from a master, the slave accepts data in the data field of the packet and stores the data into a receiver buffer (a memory). When a slave receives a communication packet from a master which instructs the reading of a slave status or a lock address. the slave returns status information 210 or a lock address 211 to the master by use of the data field of the packet. When a slave receives a communication packet from a master which instructs the writing of a memory address, the slave recognizes that the address value in the data field of the packet will be read out by a subsequent communication packet, and the slave prepares the data denoted by the address value. The contents of the lock operation is classified into locking, unlocking (releasing the lock), and nonlock. The locking is to lock a communication mate. The unlocking is to unlock a communication mate. The nonlock means that communication will be established regardless of a locked state of a communication mate.

Figure 5:
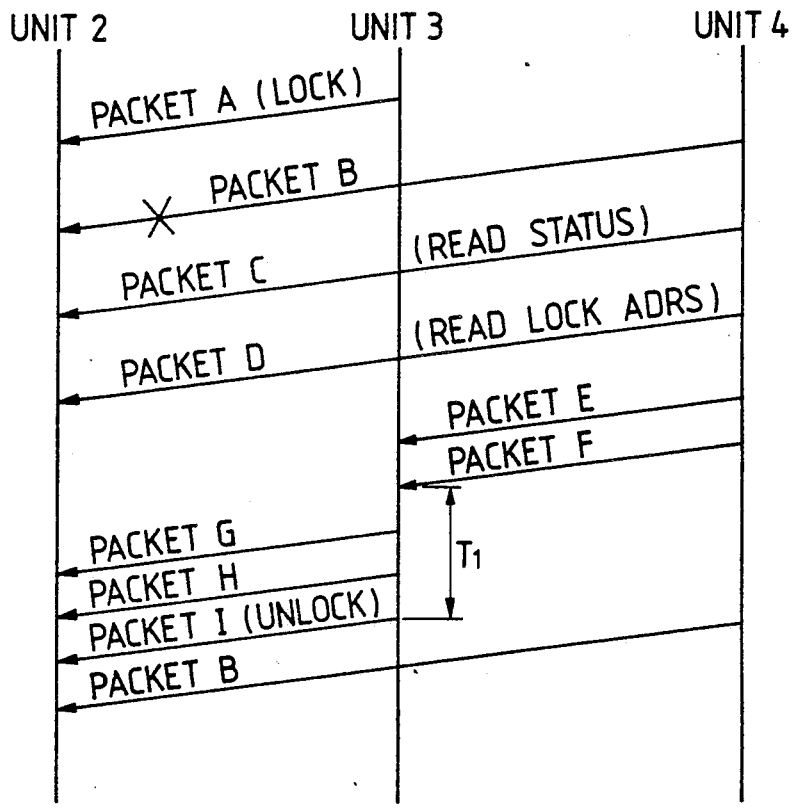
FIGS. 5 and 6 are diagrams showing different operations of the communication system of FIG. 1 respectively.

A description will be made on the case where while the communication control unit 8 remains locking the communication control unit 2, the communication control unit 4 fetches the information of the lock remaining time from the communication control unit 3. As shown in FIG. 5, the unit 3 transmits a communication packet A to the unit 2 via the transmission line 1, the packet A instructing the locking of the unit 2. In the unit 2, when the packet transceiver 20 receives the packet A, the packet transceiver 20 informs the controller 22 of the reception of the packet A. The reception of the packet A causes the controller 22 to generate information data representing that the unit 2 is locked by the unit 3. The controller 22 stores the information data into the memory 21. Specifically, the address of the unit 3 is written into the lock address segment 211 of the memory 21, and the locked information is written into the slave status segment 210 of the memory 21. In the unit 3, when the transmission of the packet A is successful, the controller 32 stores the address of the unit 2 into the lock address segment of the memory 31 and stores lock remaining time data into the related segment of the memory 81. The controller 32 periodically updates the lock remaining time data. It is assumed that, during this interval, the unit 4 transmits a communication packet B to the unit 2. When the transmission of the slave address and the related parity bit is successful, the unit 2 returns an ack bit of the positive answer "0" to the unit 4. In response to the positive ack bit "0", the unit 4 transmits the control field X'B' of the packet B. The control field X'B' represents the instruction of the writing of the locking command. When the unit 2 receives the control field X'B' of the communication packet B, the controller 22 checks the slave status 210 and the lock address 211 so that the controller 22 recognizes the current state where the unit 2 is being locked by the unit 8 and is inhibited from receiving the later part of the packet B. Accordingly, the unit 2 returns an ack bit of the negative answer "1" to the unit 4 subsequently to the parity bit for the control field. When the unit 4 receives the negative ack bit "1", the unit 4 transmits a communication packet C to the unit 2 in order to know the reason for the inhibition of the reception of the later part of the packet B by the unit 2. The packet C has the control field X'O' designed to read out the slave status from the unit 2. When the unit 2 receives the packet C, the controller 22 reads out the slave status information 210 from the memory 21 in response to the contents of the control field of the packet C. The unit 2 transmits the slave status information 210 to the unit 4 in the data field of the packet C. The unit 4 is informed by the slave status information 210 that the unit 2 is locked by another communication control unit and is thus inhibited from receiving the later part of the packet B. Accordingly, the unit 4 transmits a communication packet D to the unit 2, the packet D having the control field including the code X'4'X'5' which instructs the reading of the lock address from the unit 2. When the unit 2 receives the packet D, the controller 22 reads out the lock address 211 from the memory 21 in response to the contents of the control field of the packet D. The unit 2 transmits the lock address 211 to the unit 4 in the data field of the packet D. The unit 4 is informed by the lock address 211 that the unit 2 is locked by the unit 3. Then, the unit 4 inquires of the unit 3 as to the lock remaining time. Specifically, the unit 4 transmits a communication packet E to the unit 2. The control field of the packet E has an instruction X'8' of writing the memory address of the lock operation. The data field of the packet E has the address value "b". When the unit 3 receives the packet E, the controller 82 reads out the information of the lock remaining time T1 from the segment of the memory 31, which is designated by the address "b", so that the lock remaining time T1 is prepared. Subsequently, the unit 4 transmits a communication packet F to the unit 2. The packet F has the control field X'7' designed to read out the data of the unlocking operation, that is the lock remaining time. After the unit 3 receives the control field of the packet F, the unit 3 transmits the previously-prepared lock remaining time T1 to the unit 4 by use of the data field of the packet F. When the unit 4 receives the lock remaining time T1, the unit 4 recognizes that the unit 3 will unlock the unit 2 at the later moment determined by the lock remaining time T1. Accordingly, the unit 4 waits a time equal to or longer than the lock remaining time T1. On the other hand, the unit 3 sequentially transmits subsequent communication packets G and H to the unit 2. When the unit 3 completes the substance of the communication with the unit 2, the unit 3 transmits a unlocking packet I to the unit 2 in order to unlock the unit 2. When the unit 2 receives the packet I, the controller 22 changes the slave status 210 in the memory 21 into the unlocked state and clears the lock address 211 in the memory 21 to the empty state in response to the packet I. After the unit 4 waits the time equal to or longer than the lock remaining time T1, the unit 4 retransmits the packet B to the unit 2. When the unit 2 receives the packet B, the controller 22 checks the slave status 210 of the memory 21 and recognizes that the unit 2 is not locked. Accordingly, the controller 22 instructs the packet transceiver 20 to return the positive ack bit "0" to the unit 4 via the transmission line 1. The unit 4 transmits the data field of the packet B to the unit 2 in response to the positive ack bit "0".

Figure 6:
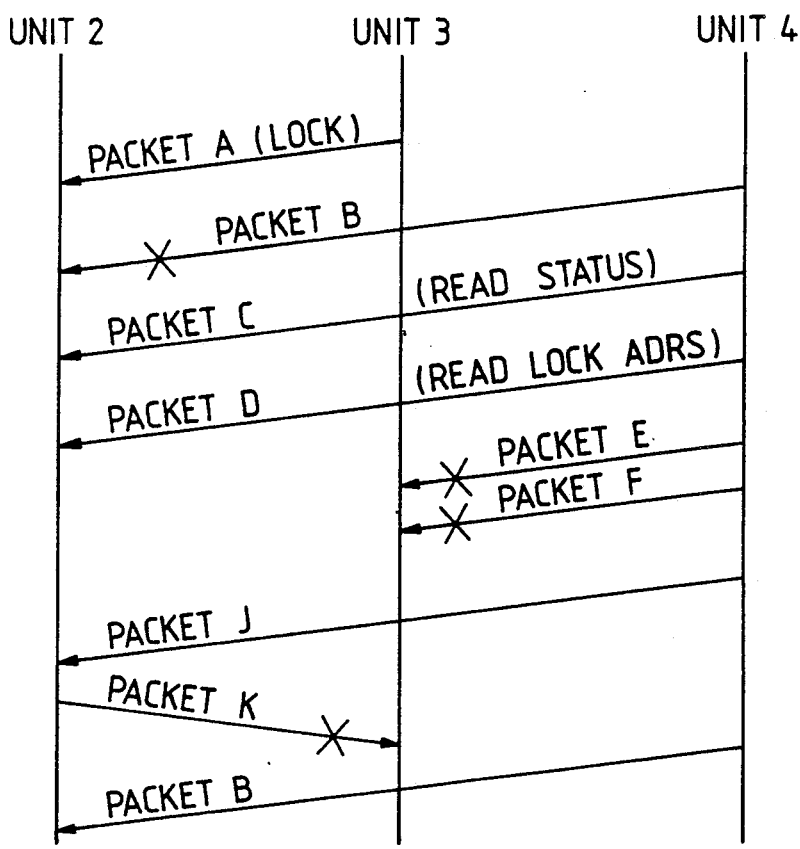

A description will be made on the case where while the communication control unit 3 locks the communication control unit 2 but a malfunction or another cause makes the communication control unit 3 incapable of unlocking the communication control unit 2, the communication control unit 4 performs the communication with the communication control unit 2. As shown in FIG. 6, the communication packets A B. C. and D are transmitted among the units 2. 8, and 4 similarly to the case of FIG. 5. The unit 3 locks the unit 2. It is assumed that a malfunction or another cause makes the unit 8 incapable of performing communication while the unit 2 remains locked. When the unit 4 transmits the communication packet E to the unit 3, the unit 3 returns the negative ack bit "1" to the unit 4 subsequently to the slave address of the packet E. Therefore, the communication between the units 3 and 4 via the substance of the packet E fails to be established. The unit 4 retransmits the packet E to the unit 3, and the unit 4 receives again the negative ack bit "1" from the unit 3. The unit 4 understands from the second reception of the negative ack bit "1" that a malfunction or another problem occurs in the unit 3. Then, the unit 4 transmits a communication packet J to the unit 2. The master address of the packet J corresponds to the address of the unit 3. The control field of the packet J represents an instruction X'A' of writing a locking command. The data field of the packet J represents that the unit 3 is incapable of communication. When the unit 2 receives the packet J, the unit 2 is informed by the packet J that the unit 3 is incapable of communication. The unit 2 transmits a communication packet K to the unit 3 in order to confirm that the unit 3 is incapable of communication. When the unit 2 receives the negative ack bit "1" from the unit 3 subsequently to the slave address of the packet K. the unit 2 confirms that the unit 3 is incapable of communication. In this case, the unit 2 cancels the locked state by itself. Specifically, the controller 22 changes the slave status 210 in the memory 21 into the unlocked state and clears the lock address of the memory 21 to the empty state. Then, the unit 4 retransmits the packet B to the unit 2 as in the case of FIG. 5.

The communication packet J may be designed as follows. The master address of the communication packet J corresponds to the address of the unit 4. The control field of the packet J enables the confirmation of a newly-defined nonlock state. The data field of the packet J represents that the unit 8 is incapable of communication.

Figure 9A:
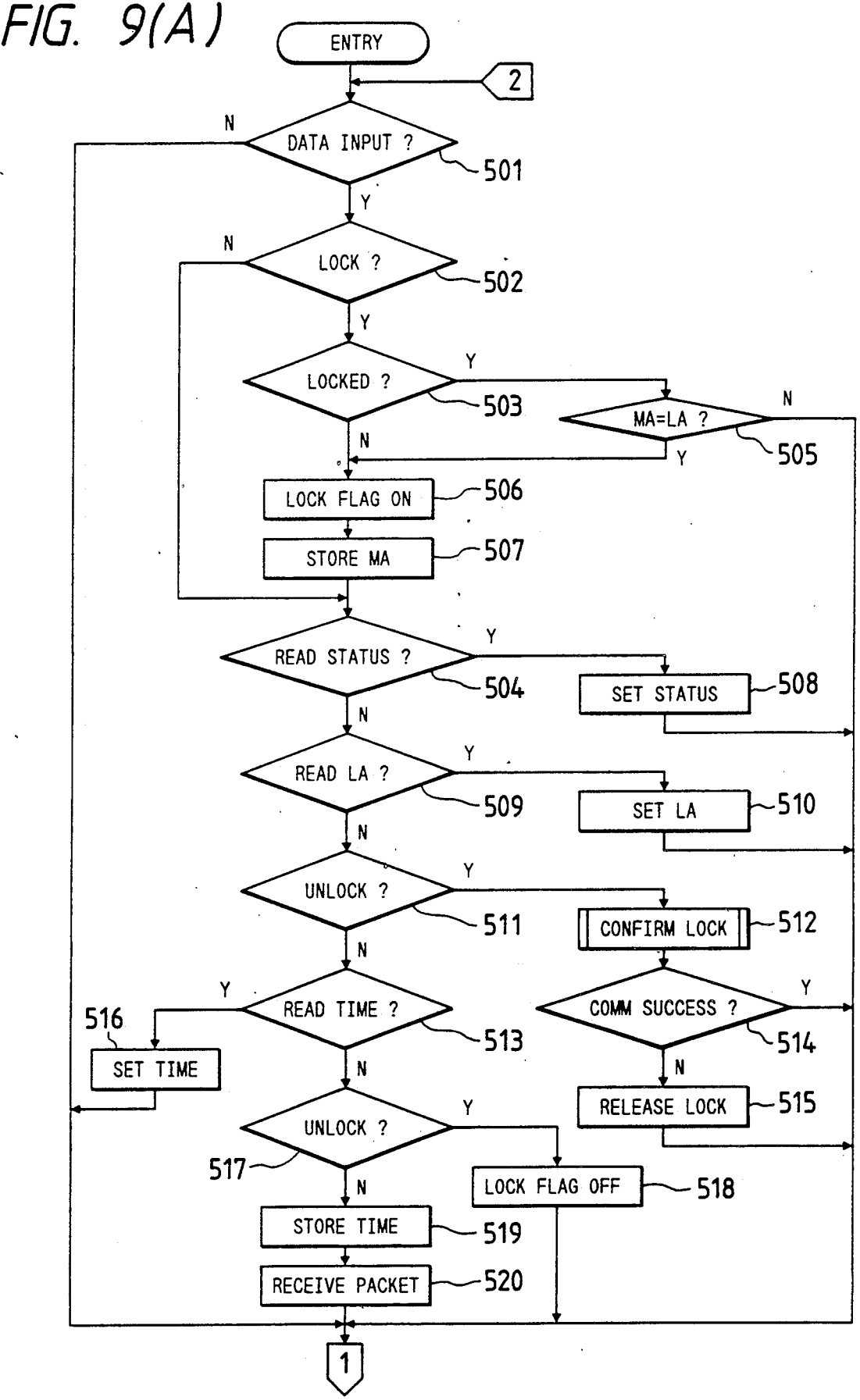
FIGS. 9A and 9B show a flowchart of a program operating a controller in the communication system of FIG. 1.
Figure 9B:
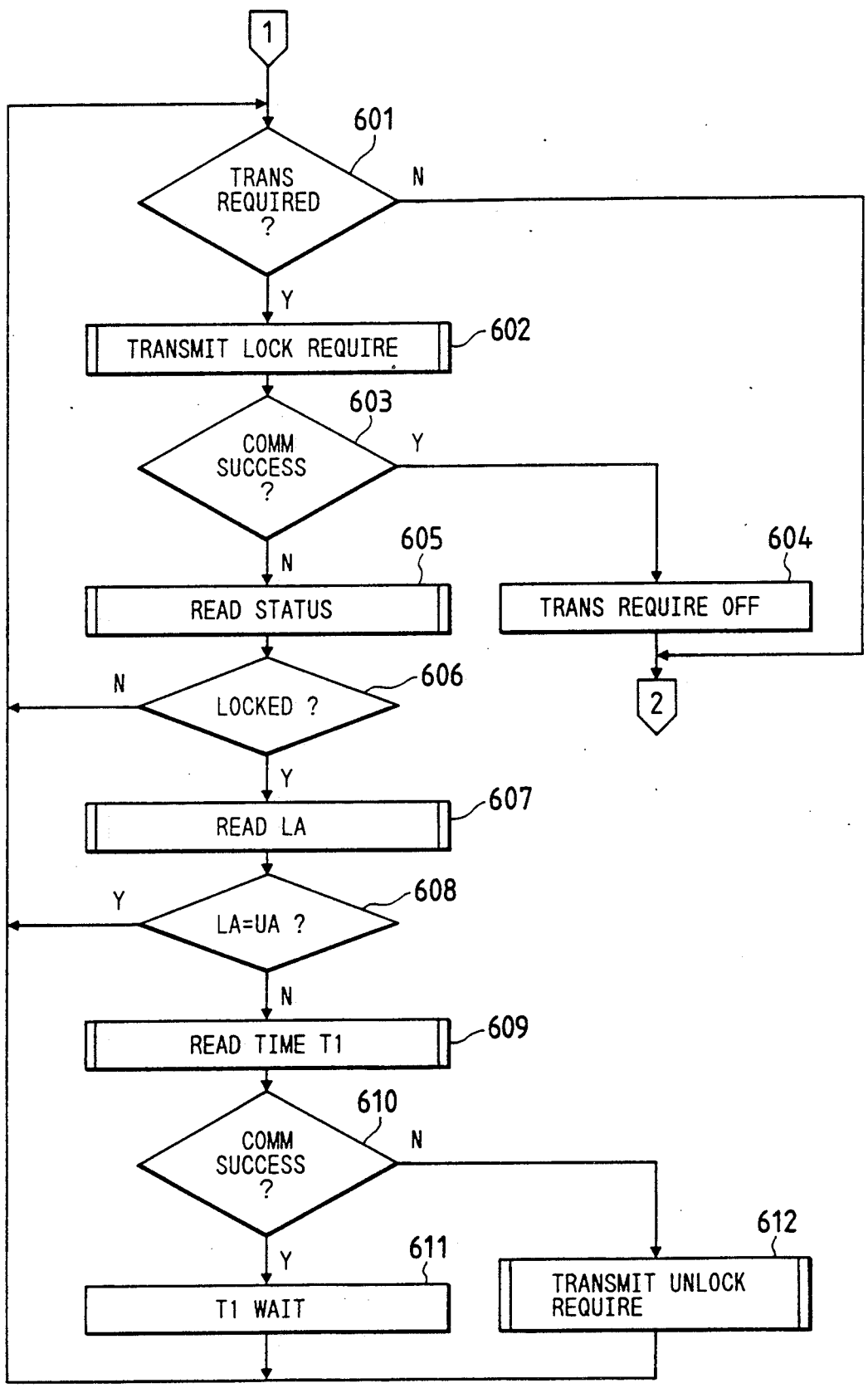

Each of the controllers 22, 32, and 42 of the communication control units 2, 3, and 4 includes a microcomputer having a combination of an input port, an output port, a CPU, a ROM, and a RAM. The microcomputer operates in accordance with a program stored in the ROM. FIG. 9 is a flowchart of this program.

As shown in FIG. 9, a first step 501 of the program determines whether or not a packet is inputted (received). When the packet is inputted, the program advances to a step 502. When the packet is not inputted, the program jumps to a step 601.

The step 502 determines whether or not the control field of the input packet represents locking. When the control field of the input packet represents locking the program advances to a step 503. When the control field of the input packet does not represent locking, the program jumps to a step 504.

The step 503 determines whether or not the present communication control unit is already in the locked state. When the unit is already in the locked state, the program advances to a step 505. When the unit is not in the locked state, the program advances to a step 506.

The step 505 determines whether or not the master address (MA) of the input packet agrees with the lock address (LA) stored in the memory of the present unit. When the master address agrees (MA) with the lock address (LA), the program advances to the step 506. When the master address (MA) does not agree with the lock address (LA), the program jumps to the step 601.

The step 506 makes on the flag in the slave status which represents that the unit is locked. A step 507 following the step 506 stores the master address (MA) of the input packet into the memory as a lock address. After the step 507 the program advances to the step 504.

The step 504 determines whether or not the control field of the input packet represents the reading of the slave status. When the control field represents the reading of the slave status, the program advances to the step 601 via a step 508 which reads out the slave status from the memory and which sets the slave status into the transceiver. When the control field does not represent the reading of the slave status, the program advances to a step 509.

The step 509 determines whether or not the control field of the input packet represents the reading of the lock address (LA). When the control field represents the reading of the lock address (MA). the program advances to the step 601 via a step 510 which reads out the lock address from the memory and sets the lock address into the transceiver. When the control field does not represent the reading of the lock address, the program advances to a step 511.

The step 511 determines whether or not the control field of the input packet requires unlocking (releasing the lock). When the control field requires unlocking, the program advances to a step 512. When the control field does not require unlocking, the program advances to a step 513.

The step 512 transmits the lock confirmation packet to the communication control unit which performs the locking. A step 514 following the step 512 determines whether or not the communication of the lock confirmation packet is successful. When the communication is successful, the program advances to the step 601. When the communication is not successful, the program advances to a step 515 which unlocks or releases the unit from the locked state by itself. After the step 515, the program advances to the step 601.

The step 513 determines whether or not the control field of the input packet represents the reading of the lock remaining time. When the control field represents the reading of the lock remaining time, the program advances to the step 601 via a step 516 which reads out the lock remaining time from the memory and sets the lock remaining time into the transceiver. When the control field does not represent the reading of the lock remaining time, the program advances to a step 517.

The step 517 determines whether or not the control field of the input packet represents unlocking (releasing the lock). When the control field represents unlocking, the program advances to the step 601 via a step 518 which makes off the flag in the slave status which represents that the unit is locked. When the control field does not represent unlocking, the program advances to a step 519 which stores the data processing time into the memory as the lock remaining time.

After the step 519, the program advances to the step 601 via a step 520 which allows the reception of the data field of the input packet.

The step 601 determines whether or not a transmission requirement is present. When a transmission requirement is absent, the program returns to the step 501. When a transmission requirement is present the program advances to a step 602. The step 602 transmits the lock-requiring packet to the designated or target communication control unit.

A step 603 following the step 602 determines whether or not the communication of the lock-requiring packet is successful. When the communication is successful, the program returns to the step 501 via a step 604 which cancels the transmission requirement. When the communication is not successful, the program advances to a step 605 which reads out the slave status from the designated unit.

A step 606 following the step 605 determines whether or not the designated unit is in the locked state by referring to the slave states read out by the step 605. When the designated unit is not in the locked state, the program returns to the step 601. When the designated unit is in the locked state, the program advances to a step 607 which reads out the lock address from the designated unit.

A step 608 following the step 607 determines whether or not the lock address (LA) read out by the step 607 agrees with the address (UA) of the present unit. When the lock address (LA) agrees with the address (UA) of the present unit, the program returns to the step 601. When the lock address (LA) does not agree with the address (UA) of the present unit, the program advances to a step 609.

The step 609 transmits a packet to the unit which performs the locking, the packet allowing the reading of the lock remaining time from the locking unit. A step 610 following the step 609 determines whether or not the communication of the time-reading packet is successful. When the communication is successful, the program advances to a step 611 which waits the time T1 corresponding to the lock remaining time. When the communication is not successful, the program advances to a step 612 which requires the locked unit to release the locked state by itself. After the steps 611 and 612, the program returns to the step 601.

DESCRIPTION OF THE SECOND PREFERRED EMBODIMENT

Figure 7:
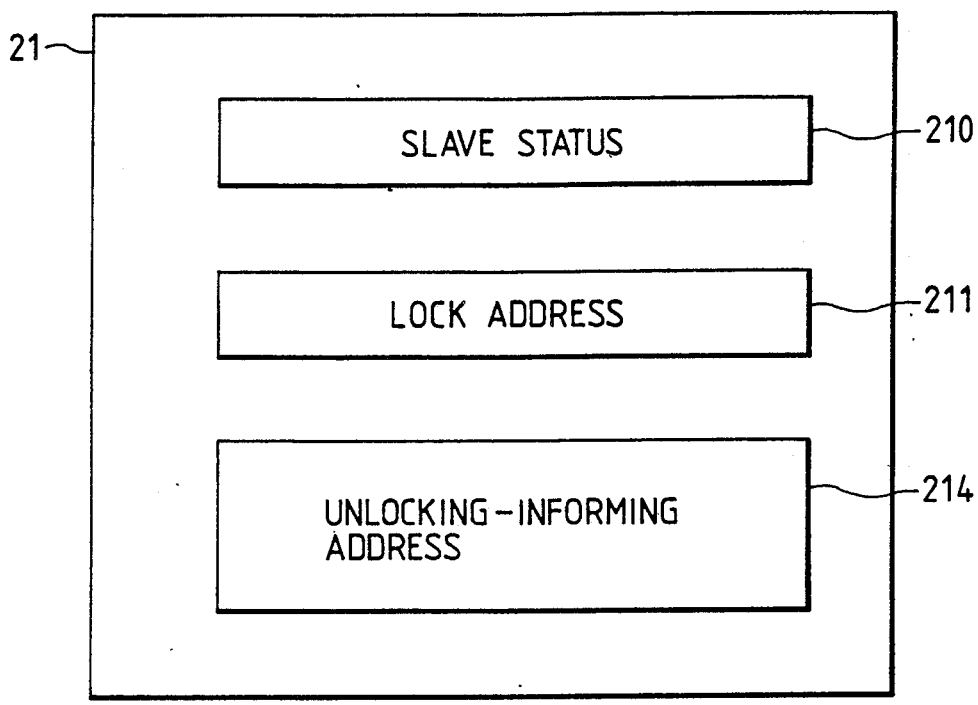
FIG. 7 is a diagram of a memory in a communication system according to a second embodiment of this invention.
Figure 8:
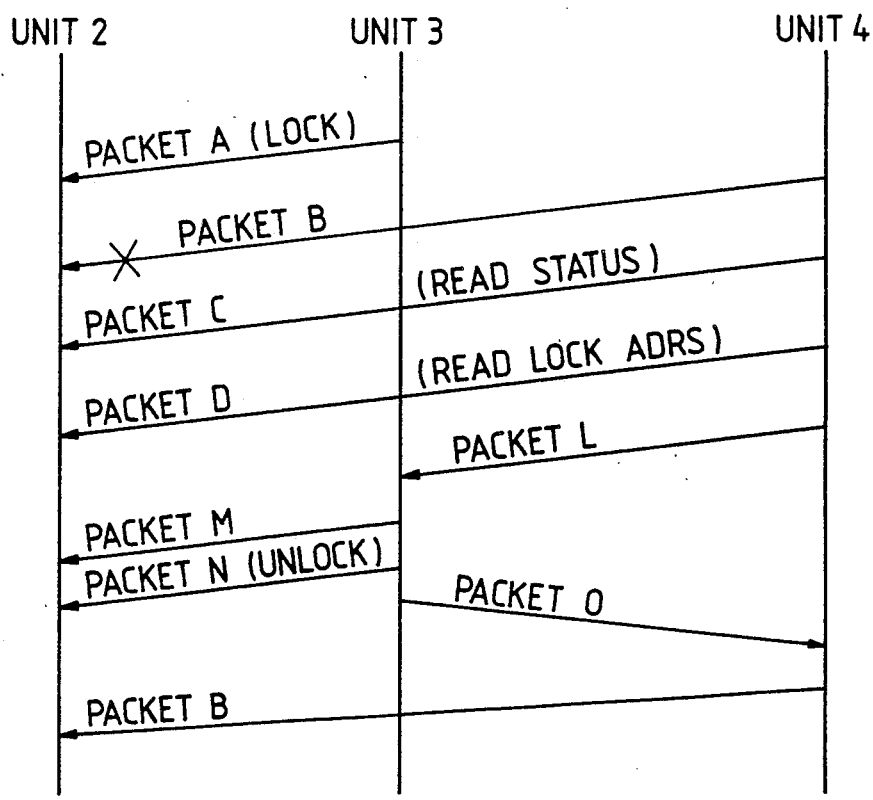
FIG. 8 is a diagram showing operation of the communication system of the second embodiment.

FIGS. 7 and 8 relate to a second embodiment of this invention which is similar to the embodiment of FIGS. 1-6 except for the following design changes.

As shown in FIG. 7, the memory 21 has segments for storing respective information data 210, 211, and 214. Different addresses are allotted to the respective segments of the memory 21. The information data 210 relates to a slave status representing whether or not the unit 2 is in a locked (held) state. The information data 211 relates to an address of a unit which locks (holds) the unit 2. The information data 214 relates to an address of a unit which is to be informed that the unit 2 is unlocked. The memories 31 and 41 (see FIG. 1) are similar to the memory 21.

A description will be made on the case where while the communication control unit S (see FIG. 1) remains locking the communication control unit 2 (see FIG. 1), the communication control unit 4 (see FIG. 1) obtains information from the communication control unit 3, the information representing a timing at which communication with the communication control unit 2 becomes allowed. As shown in FIG. 8, the unit 3 transmits a communication packet A to the unit 2 via the transmission line 1, the packet A instructing the locking of the unit 2. In the unit 2, when the packet transceiver 20 receives the packet A, the packet transceiver 20 informs the controller 22 of the reception of the packet A. The reception of the packet A causes the controller 22 to generate information data representing that the unit 2 is locked by the unit 3. The controller 22 stores the information data into the memory 21. Specifically, the address of the unit 3 is written into the lock address segment 211 of the memory 21, and the locked information is written into the slave status segment 210 of the memory 21. It is assumed that, under these conditions, the unit 4 sequentially transmits communication packets B, C. and D to the unit 2. The processing of the packet B, C. and D is similar to that in the case of FIG. 5. When the unit 4 recognizes that the unit 2 is locked by the unit 3, the unit 4 transmits a communication packet L to the unit 3. The communication packet L is designed to require the unit 3 to inform the unit 4 of the unlocking of the unit 2. When the unit 3 receives the packet L, the controller 32 stores the address of the unit 4 into the unlocking-informing address segment of the memory 31. On the other hand, the unit 3 sequentially transmits a subsequent communication packet M to the unit 2. When the unit 3 completes the substance of the communication with the unit 2, the unit 3 transmits a final communication packet N to the unit 2. The packet N instructs the unlocking of the unit 2. After the unit 2 receives and processes the packet N. the controller 22 changes the slave status 210 in the memory 21 into the unlocked condition and clears the lock address 211 in the memory 21 to the empty state. After the unit 3 transmits the packet N t the unit 2, the unit 3 generates a communication packet 0 on the basis of the unlocking-informing address of the memory 31 and transmits the packet 0 to the unit 4. When the unit 4 receives the packet 0, the unit 4 is informed that the unit 2 is unlocked. Then, the unit 4 retransmits the packet B to the unit 2. When the unit 2 receives the packet B, the controller 22 checks the slave status 210 of the memory 21 and recognizes that the unit 2 is not locked. Accordingly, the controller 22 instructs the packet transceiver 20 to return the positive ack bit "0" to the unit 4 via the transmission line 1. The unit 4 transmits the data field of the packet B to the unit 2 in response to the positive ack bit "0". In this way, the communication between the units 2 and 4 via the packet B is established.

Figure 10A:
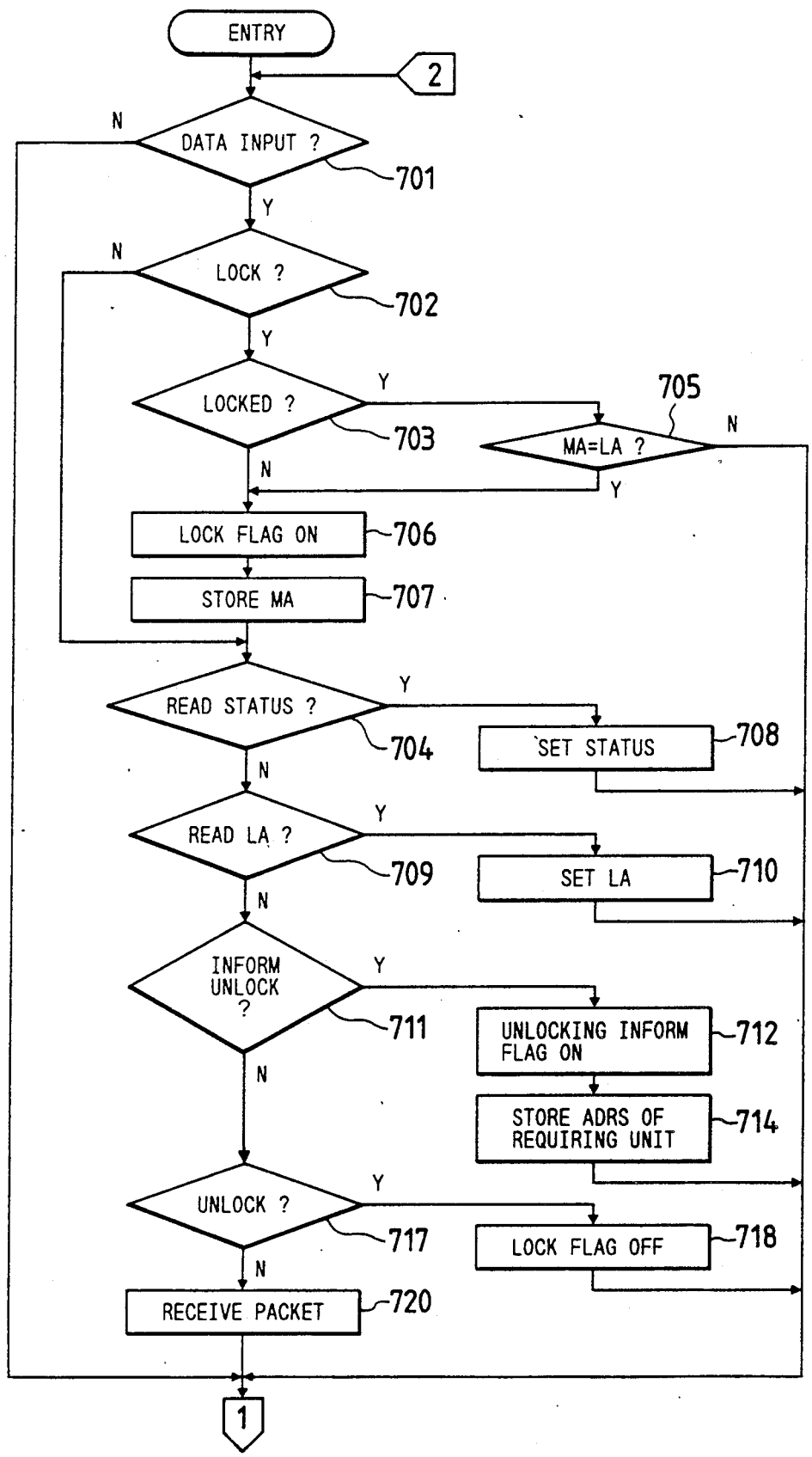
FIGS. 10A and 10B show a flowchart of a program operating a controller in the communication system of the second embodiment.
Figure 10B:
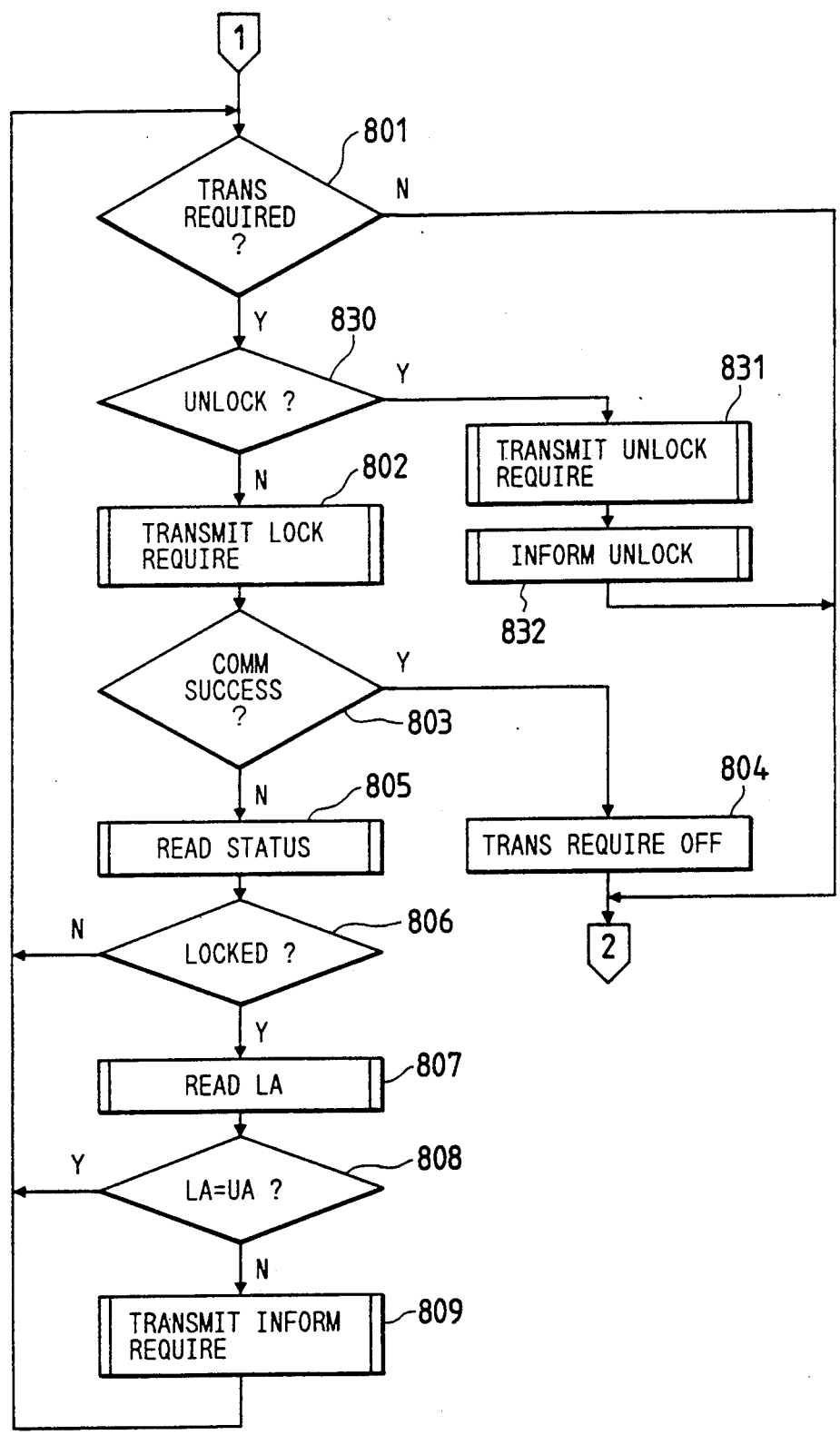

FIG. 10 is a flowchart of a program operating each of the controllers of the communication control units. As shown in FIG. 10, a first step 701 of the program determines whether or not a packet is inputted (received). When the packet is inputted, the program advances to a step 702. When the packet is not inputted, the program jumps to a step 801.

The step 702 determines whether or not the control field of the input packet represents locking. When the control field of the input packet represents locking, the program advances to a step 703. When the control field of the input packet does not represent locking, the program jumps to a step 704.

The step 703 determines whether or not the present communication control unit is already in the locked state. When the unit is already in the locked state, the program advances to a step 703. When the unit is not in the locked state, the program advances to a step 706.

The step 705 determines whether or not the master address (MA) of the input packet agrees with the lock address (LA) stored in the memory of the present unit. When the master address (MA) agrees with the lock address (LA), the program advances to the step 706. When the master address (MA) does not agree with the lock address (LA), the program jumps to the step 801.

The step 706 makes on the flag in the slave status which represents that the unit is locked. A step 707 following the step 706 stores the master address (MA) the input packet into the memory as a lock address. After the step 707, the program advances to the step 704.

The step 704 determines whether or not the control field of the input packet represents the reading of the slave status. When the control field represents the reading of the slave status, the program advances to the step 801 via a step 708 which reads out the slave status from the memory and which sets the slave status into the transceiver. When the control field does not represent the reading of the slave status, the program advances to a step 709.

The step 709 determines whether or not the control field of the input packet represents the reading of the lock address (LA). When the control field represents the reading of the lock address (MA), the program advances to the step 801 via a step 710 which reads out the lock address from the memory and sets the lock address into the transceiver. When the control field does not represent the reading of the lock address, the program advances to a step 711.

The step 711 determines whether or not the control field of the input packet requires the notification of the unlocking. When the control field requires the notification of the unlocking the program advances to a step 712. When the control field does not require the notification of the unlocking, the program advances to a step 717.

The step 712 makes on the unlocking-informing flag. A step 714 following the step 712 loads the memory with the address of the communication control unit which requires the notification of the unlocking. After the step 714, the program advances to the step 801.

The step 717 determines whether or not the control field of the input packet represents unlocking (releasing the lock). When the control field represents unlocking, the program advances to the step 801 via a step 718 which makes off the flag in the slave status which represents that the unit is locked. When the control field does not represent unlocking, the program advances to a step 720 which allows the reception of the data field of the input packet. After the step 720, the program advances to the step 801.

The step 801 determines whether or not a transmission requirement is present. When a transmission requirement is absent, the program returns to the step 701. When a transmission requirement is present, the program advances to a step 830.

The step 830 determines whether or not the unlocking is required. When the unlocking is not required the program advances to a step 802. When the unlocking is required, the program advances to a step 831. The step 831 transmits a packet which releases the locked communication control unit. A step 832 following the step 831 gives the information of the unlocking to the communication control unit which requires the notice of the unlocking. After the step 832, the program returns to the step 701.

The step 802 transmits the lock-requiring packet to the target communication control unit. A step 803 following the step 802 determines whether or not the communication of the lock-requiring packet is successful. When the communication is successful, the program returns to the step 701 via a step 804 which cancels the transmission requirement. When the communication is not successful, the program advances to a step 805 which reads out the slave status from the designated unit.

A step 806 following the step 805 determines whether or not the designated unit is in the locked state by referring to the slave states read out by the step 805. When the designated unit is not in the locked state, the program returns to the step 801. When the designated unit is in the locked state, the program advances to a step 807 which reads out the lock address from the designated unit.

A step 808 following the step 807 determines whether or not the lock address (LA) read out by the step 807 agrees with the address (UA) of the present unit. When the lock address (LA) agrees with the address (UA) of the present unit, the program returns to the step 801. When the lock address (LA) does not agree with the address (UA) of the present unit, the program advances to a step 809.

The step 809 transmits a packet to the unit which performs the locking, the packet requiring the notification of the unlocking. After the step 809, the program returns to the step 801.

What is claimed is:

1. A communication system comprising:
   first, second, and third communication control units identified by respective different addresses;
   the first unit comprising means for, in cases where the first unit locks the second unit to communicate with the second unit, storing a data representing a time remaining until the locking of the second unit is released;
   the second unit comprising means for, in cases where the first unit locks the second unit to communicate with the second unit, storing a data representing the address of the first unit as a lock address corresponding to an address of a unit which locks the second unit:
   the third unit comprising means for, in cases where the third unit tries to communicate with the second unit and fails the communication with the second unit, connecting with the second unit and reading out the data representative of the lock address from the second unit, means for connecting with the first unit in response to the lock address and reading out the data representative of the lock remaining time from the first unit, and means for retrying to communicate with the second unit after the lock remaining time elapses.

2. The communication system of claim 1 wherein the third unit comprises means for, in cases where the first unit locks the second unit and then first unit falls into a state in which the first unit is incapable of unlocking the second unit, detecting that the first unit is in the unlocking-incapable state, and means for informing the second unit that the first unit is in the unlocking-incapable state, and the second unit comprises means for releasing the locking by the first unit when the second unit is informed by the third unit that the first unit is in the unlocking-incapable state.

3. A communication system comprising:
   first, second, and third communication control units identified by respective different addresses:
   the second unit comprising means for, in cases where the first unit locks the second unit, storing a data representing the address of the first unit as a lock address corresponding to an address of unit which locks the second unit;
   the third unit comprising means for, in cases where the third unit tries to communicate with the second unit and fails the communication with the second unit, connecting with the second unit and reading out the data representative of the lock address from the second unit. means for connecting with the first unit in response to the lock address and requiring the first unit to inform the third unit that the first unit unlocks the second unit;
   the first unit comprising means responsive to the requiring by the third unit for, when the first unit unlocks the second unit, informing the third unit that the second unit is unlocked;
   the third unit further comprising means for retrying to communicate with the second unit when the third unit is informed that the second unit is unlocked.

4. The communication system of claim 3 wherein the third unit comprises means for, in cases where the first unit locks the second unit and then first unit falls into a state in which the first unit is incapable of unlocking the second unit, detecting that the first unit is in the unlocking-incapable state, and means for informing the second unit that the first unit is in the unlocking-incapable state, and the second unit comprises means for releasing the locking by the first unit when the second unit is informed by the third unit that the first unit is in the unlocking-incapable state.

* * * * *